C. W. WEISS.
TURBINE ENGINE.
APPLICATION FILED SEPT. 19, 1903.
926,157.
Patented June 29, 1909.
2 SHEETS—SHEET 1.
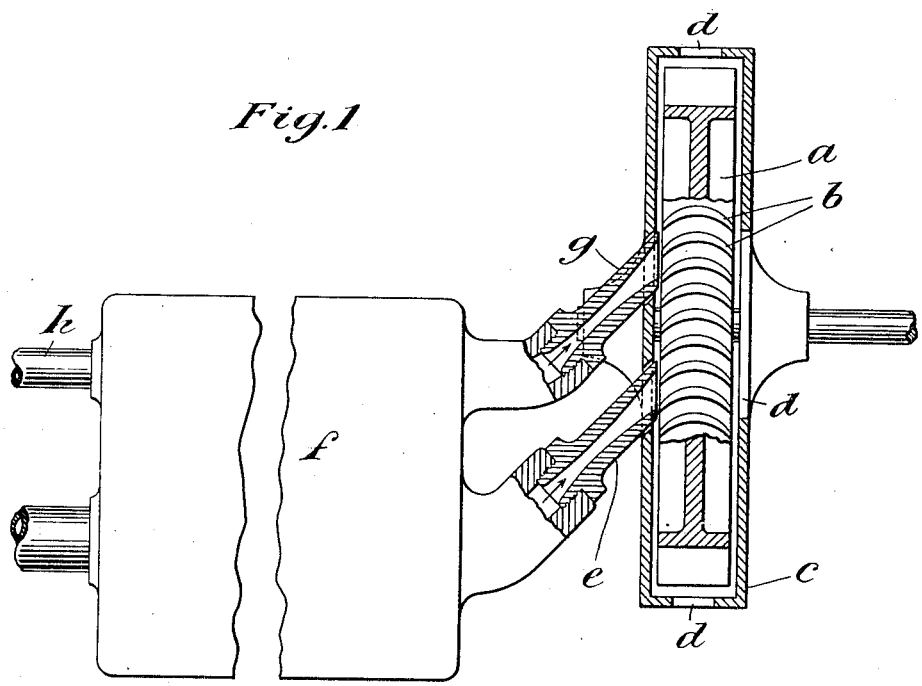
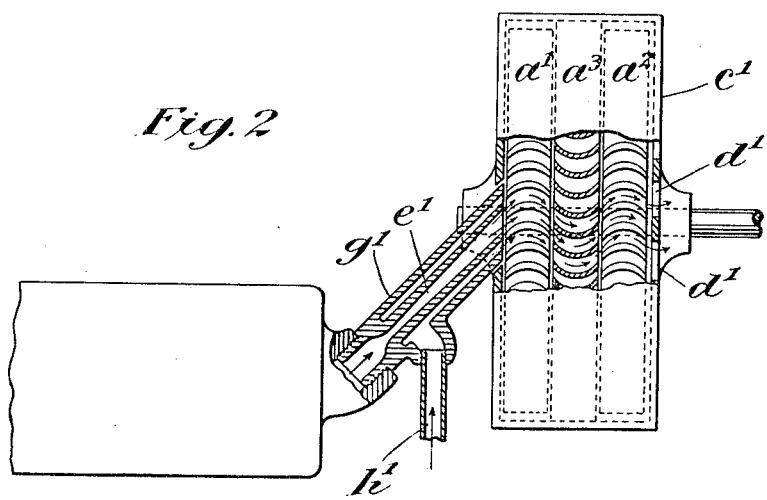

C. W. WEISS.
TURBINE ENGINE.
APPLICATION FILED SEPT. 19, 1903.
926,157.
Patented June 29, 1909.
2 SHEETS—SHEET 2.
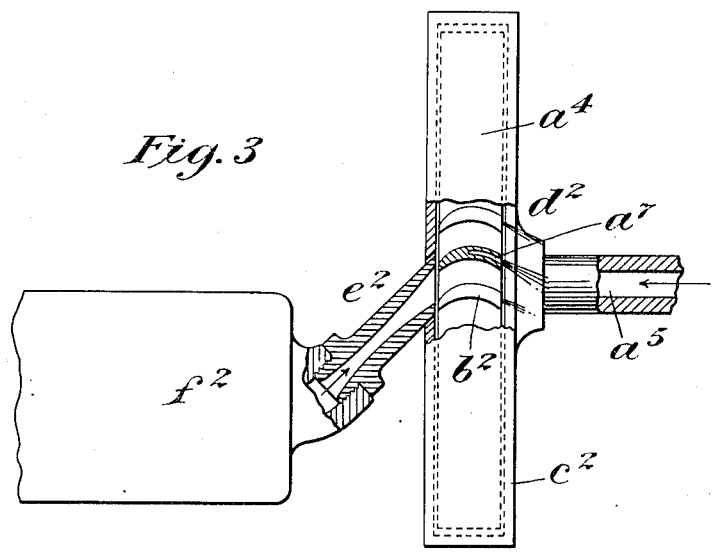
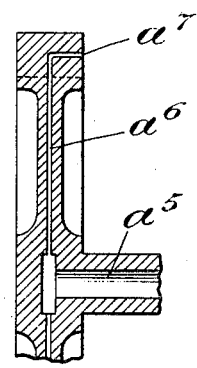
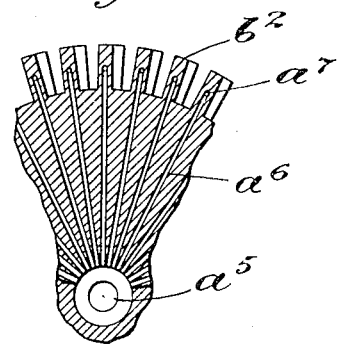

UNITED STATES PATENT OFFICE.

CARL W. WEISS, OF NEW YORK, N. Y.

TURBINE-ENGINE.

No. 926,157.      Specification of Letters Patent.      Patented June 29, 1909.

Application filed September 19, 1903. Serial No. 173,754.

*To all whom it may concern:*

Be it known that I, CARL W. WEISS, a citizen of the United States, residing in the borough of Brooklyn, of the city of New York, in the State of New York, have invented certain new and useful Improvements in Turbine-Engines, of which the following is a specification, reference being had to the accompanying drawings, forming a part thereof.

In Letters Patent of the United States, No. 710,130, dated September 30, 1902, there is shown and described a source of energy in which the pressure depends upon the development of high temperature, the energy being utilized by direct impingement of the hot blast upon the blades of a turbine, as set forth in the specification and drawings of said patent. It is clear that on account of the intense heat of the hot gases within the turbine, the temperature of the turbine and of the exhaust from the turbine will be very high, and the heat of the exhaust, under the usual conditions of operation, is a total loss. Furthermore, the intense heat of the blast developed by the apparatus shown in said patent is found to be destructive to the turbine, as well as to the nozzle of the generating apparatus and therefore while it is necessary to make the temperature of the blast or jet as high as possible, it is also desirable to reduce the temperature at or in the turbine. It will be obvious that ordinary cooling devices, such as are employed in other forms of motors, are inefficient or practically impossible of application in the operation of motors of the type herein referred to, and also that such cooling devices have been neutral, that is, have effected the cooling of the apparatuses to which they were applied without changing their efficiency.

It is proposed by this invention to increase the efficiency of hot blast turbines, and to eliminate the destructive effect of the hot blast upon the turbine. It has been found that the desired results can be accomplished by the application, independently of the hot blast or driving jet, within the turbine, of a working medium preferably steam, at a temperature lower than that of the driving jet of fluid. The result of this is not only to reduce the temperature within the turbine to a degree which is not destructive, but to increase the efficiency of the turbine through the expansion of the steam and the consequent reaction without lowering the temperature of the hot blast. It is obvious that the means herein described of reducing the temperature and increasing the efficiency of hot blast turbines is independent of the particular form of apparatus with which it may be practiced as well as of the particular form of the turbine to the operation of which it may be applied, and in the accompanying drawings several different structures are represented as illustrative of the different forms of apparatus and turbines with which the method can be employed.

In said drawings,—Figure 1 is a view showing, in section, a turbine and suitable connections for supplying the two working media, the sources of such working media being indicated in elevation; Figs. 2 and 3 are similar views illustrating different forms; Figs. 4 and 5 are detail views, in longitdinal and transverse section respectively, illustrating features of construction of the turbine shown in Fig. 3.

In the structure illustrated in Fig. 1 provision is made for the introduction of the two jets of working medium or fluid, of high and relatively low temperatures respectively into the turbine, at different points. The single turbine wheel $a$ is shown as provided with the usual blades or buckets $b$, the wheel being inclosed in a cylindrical casing $c$ provided, as usual, with exhaust outlets as at $d$. At the proper point in the casing is located the nozzle $e$ by which the hot blast from the generator $f$ is introduced and directed against the blades or buckets of the wheel. At another point, preferably a little beyond the nozzle $e$, and preferably in the direction of rotation of the wheel, is a second nozzle $g$ which is connected with a source of supply, represented by the pipe $h$, of a working medium or fluid of lower temperature than the driving substance or fluid, such substance or fluid, as already suggested, being preferably steam. In the operation of the turbine the jet of cooler substance delivered directly to the turbine through the nozzle $g$, impinges upon the blades or buckets of the wheel $a$ already set in motion by the driving jet from the nozzle $e$, and reduces the temperature of the wheel without in any degree reducing the efficiency of the blast through the nozzle $e$. Furthermore, as the steam impinges upon the blades or buckets of the wheel its own temperature is raised and through its further expansion and reaction the efficiency of the turbine is further increased.

In Fig. 2 the turbine is represented as a compound turbine, having two rotary wheels $a$ and $a^2$, and intermediate stationary vanes $a^3$ while exhaust openings are provided at $d'$ in the side wall of the casing, this construction being well known. The nozzle through which the hot blast is delivered is, in this case, so formed as to be cooled somewhat by the cooler fluid employed, the cooling of the nozzle itself not operating to reduce the efficiency of the blast. To this end the nozzle is itself compound, comprising an inner channel $e'$ through which the hot blast is delivered to the wheel, and an annular encircling channel $g'$ which is connected to the source of supply $h'$ of the cooler fluid, and through which the cooling medium is delivered to this turbine independently of the hot blast.

In the structural embodiment of the invention represented in Figs. 3, 4, and 5, a single wheel $a^4$ is shown as mounted within a casing $c^2$, the latter being provided in its side wall with exhaust openings as at $d^2$. The hot blast nozzle $e^2$ and the generator $f^2$ are arranged substantially as described with reference to Fig. 1. The wheel $a^4$, however, has a tubular hub $a^5$ which communicates through radial channels $a^6$ with lateral channels $a^7$ located in the blades $b^2$. The cooler fluid is delivered to the turbine through the tubular hub $a^5$ and escapes through the channels $a^7$, reducing the temperature of the wheel and being itself further expanded and reacting to increase the efficiency of the turbine.

It will be understood that both the working media, the products of combustion and the steam as specifically mentioned, are delivered or applied to the rotating element of my turbine continuously; and that the working medium of higher temperature, the products of combustion, is delivered thereto at high temperature and without preliminary cooling. By this latter statement I mean that the products of combustion are delivered to the rotary element at as high a temperature as possible; and that I avoid as much as possible all features of construction, and all treatment of the products of combustion, which would tend to cool the said products before they are delivered to the turbine. I am, of course, aware that it would be a physical impossibility to deliver the products of combustion to the turbine wheel at absolutely the same temperature as the temperature of combustion, and that there will necessarily be some cooling of the said products as they pass to the turbine. I, however, aim to avoid this cooling action to as great an extent as possible.

Various other embodiments and practical expressions of the invention will readily suggest themselves.

I claim as my invention:

1. In a turbine operated by products of combustion under pressure, a rotating element; means for applying products of combustion continuously and at high temperature and without preliminary cooling to said rotating element; and means independent of said first mentioned means for simultaneously and continuously applying to said rotating element a second working medium, the temperature of said second medium being lower than that of said products of combustion.

2. In a turbine operated by products of combustion under pressure, a rotating element; a nozzle adapted to deliver products of combustion continuously and at high temperature and without preliminary cooling to said rotating element; and a second nozzle adapted to simultaneously and continuously deliver a second working medium to said rotating element, the temperature of said second medium being lower than that of said products of combustion.

3. In a turbine operated by products of combustion under pressure, a rotating element; a nozzle adapted to deliver products of combustion continuously and at high temperature and without preliminary cooling to one portion of said rotating element; and a second nozzle adapted to simultaneously and continuously deliver a second working medium to another portion of said rotating element, the temperature of said second medium being lower than that of said products of combustion.

4. In a turbine operated by products of combustion under pressure, a rotating element; a nozzle adapted to deliver products of combustion continuously and at high temperature and without preliminary cooling to said rotating element; and a second nozzle adapted to simultaneously and continuously deliver steam under pressure to said rotating element.

5. In a turbine operated by products of combustion under pressure, a rotating element; a nozzle adapted to deliver products of combustion continuously and at high temperature and without preliminary cooling to one portion of said rotating element; and a second nozzle adapted to simultaneously and continuously deliver steam under pressure to another portion of said rotating element.

6. In a turbine operated by products of combustion under pressure, a rotating element having a series of blades formed upon its periphery; a nozzle adapted to deliver products of combustion continuously and at high temperature and without preliminary cooling to one portion of said series of blades; and a second nozzle adapted to simultaneously and continuously deliver a second working medium to another portion of said series of blades, the temperature of said second medium being lower than that of said products of combustion.

This specification signed and witnessed this 15th day of September A. D., 1903.

CARL W. WEISS.

In the presence of—
JOHN M. SCOBLE,
M. A. BRAYLEY.